Figure 1:
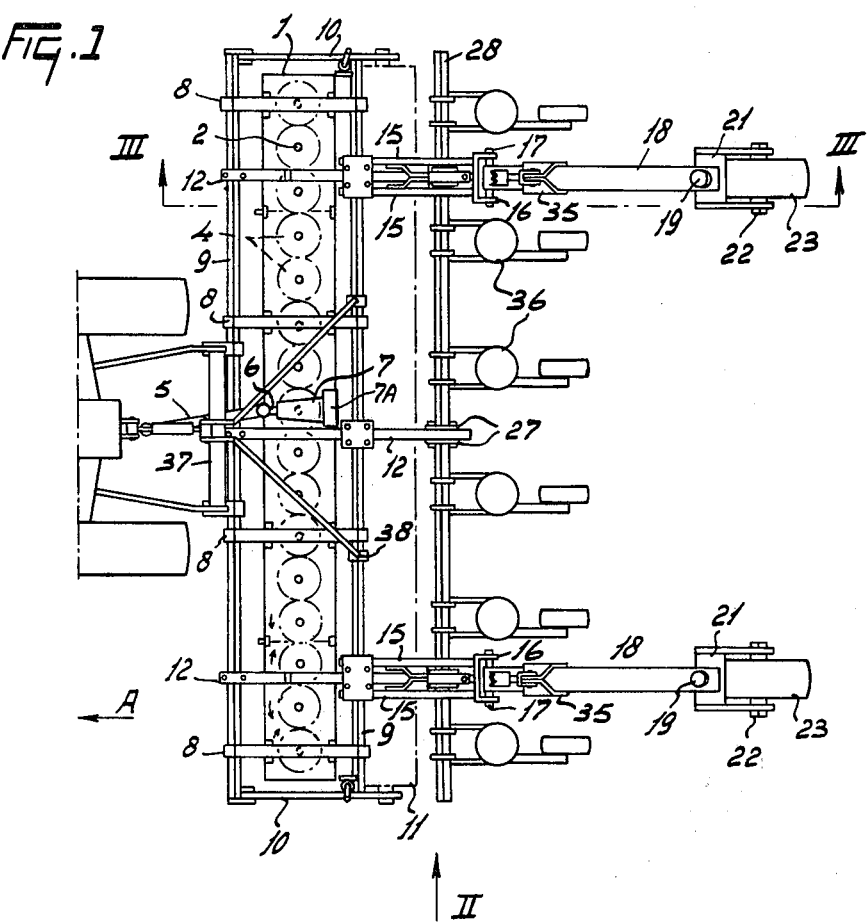

United States Patent [19]

van der Lely et al.

[11] 4,057,111

[45] Nov. 8, 1977

[54] SOIL CULTIVATING MACHINES

[75] Inventors: Ary van der Lely, Maasland; Cornelis Johannes Gerardus Bom, Rozenburg, both of Netherlands

[73] Assignee: C. van der Lely N. V., Maasland, Netherlands

[21] Appl. No.: 640,731

[22] Filed: Dec. 15, 1975

[30] Foreign Application Priority Data

Dec. 16, 1974 Netherlands .................. 7416324

[51] Int. Cl.² ................... A01B 33/16; A01B 33/06
[52] U.S. Cl. ................... 172/72; 172/68; 172/318; 172/413; 172/421; 172/59
[58] Field of Search .............. 172/72, 397, 59, 317, 172/318, 75, 76, 78, 79, 90, 400, 413, 421

[56] References Cited

U.S. PATENT DOCUMENTS

| 2,651,246 | 9/1953 | Peter et al. | 172/59 |
| 2,970,658 | 2/1961 | Kopaska | 172/397 X |
| 3,032,902 | 5/1962 | Shumaker | 172/4.5 |
| 3,661,213 | 5/1972 | Taylor | 172/72 |
| 3,826,314 | 7/1974 | van der Lely et al. | 172/59 |

*Primary Examiner*—George J. Marlo
*Attorney, Agent, or Firm*—Mason, Mason & Albright

[57] ABSTRACT

A soil cultivating machine has a row of driven rotatable soil working members and a tool bar at the rear thereof to which tools, such as seed drills can be attached. The machine is connectable to a tractor lift and the members are driven via a p.t.o. At least one supporting member is detachably connected to the machine frame and the tool bar for operational support and transport purposes. The supporting member is elongated and extends rearwardly from the frame above the tool bar and to a rear support wheel. The supporting member includes a forward support that is pivoted to a rear arm and a hydraulic assembly bridges the pivot connection. Actuation of the assembly lifts the machine, including any tools on the tool bar so that the entire machine with attachments are supported solely by the tractor lift and the rear wheel or wheels.

10 Claims, 7 Drawing Figures

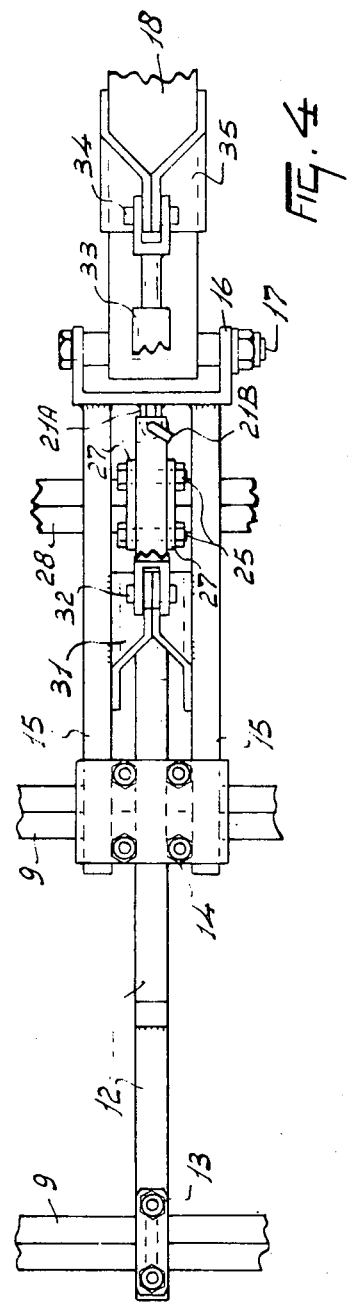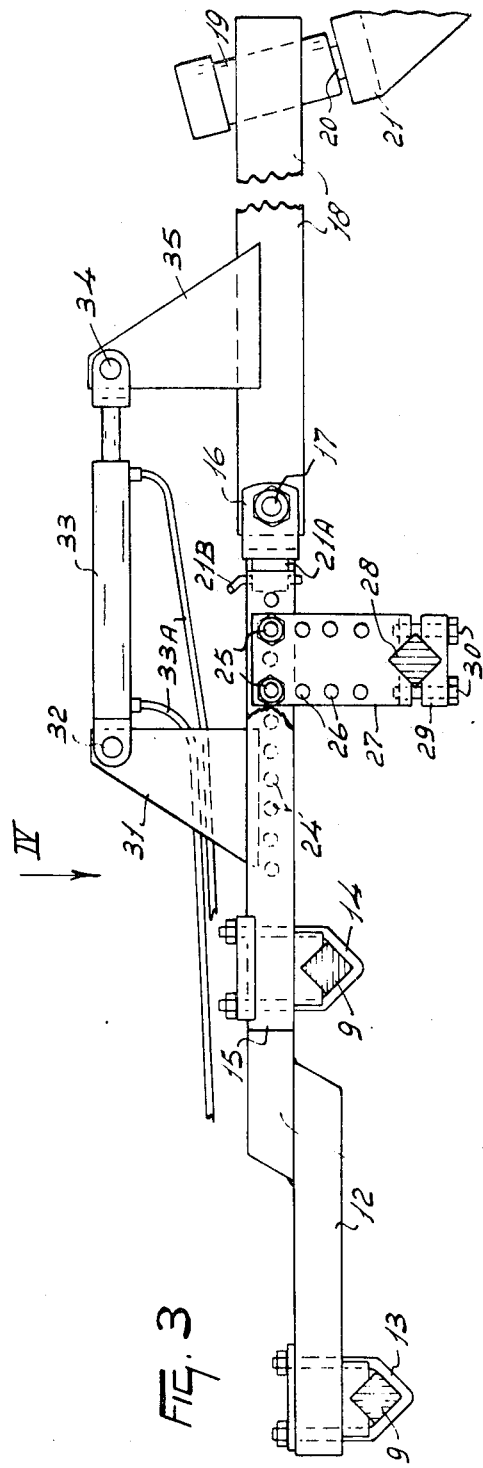

SOIL CULTIVATING MACHINES

Machines provided with a tool bar have the problem that if a heavy tool or a plurality of tools is mounted over a large width on the tool bar, the weight of the assembly of machine and tool is great for transport over long distances, while putting the assembly into, and taking it out of, operation cannot be readily carried out. The provision of a readily attachable and detachable supporting member which when attached supports the machine from the ground facilitates transport of the soil cultivating machine, with a tool or tools attached to the tool bar, along the road; while putting the assembly into, and taking it out of, operation can be performed under improved control, which is important on fields with many curves. If the cultivating members only of the soil cultivating machine are to be employed, the supporting member can be readily detached from the machine.

Figure 2:
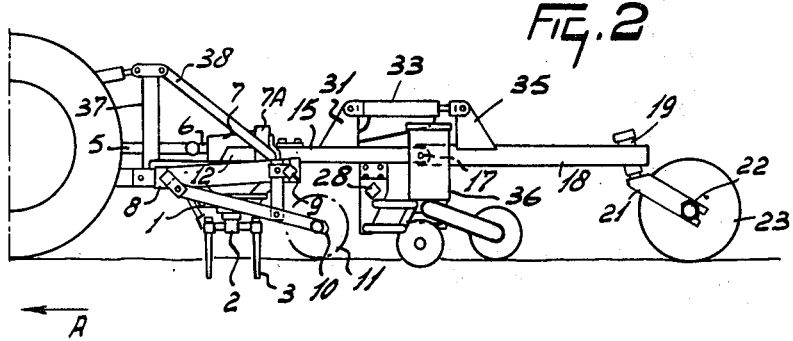
Figure 5:
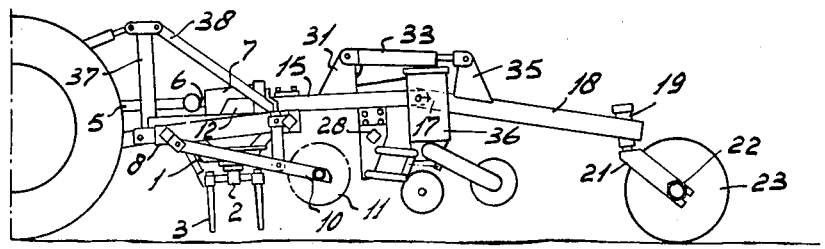
Figure 6:
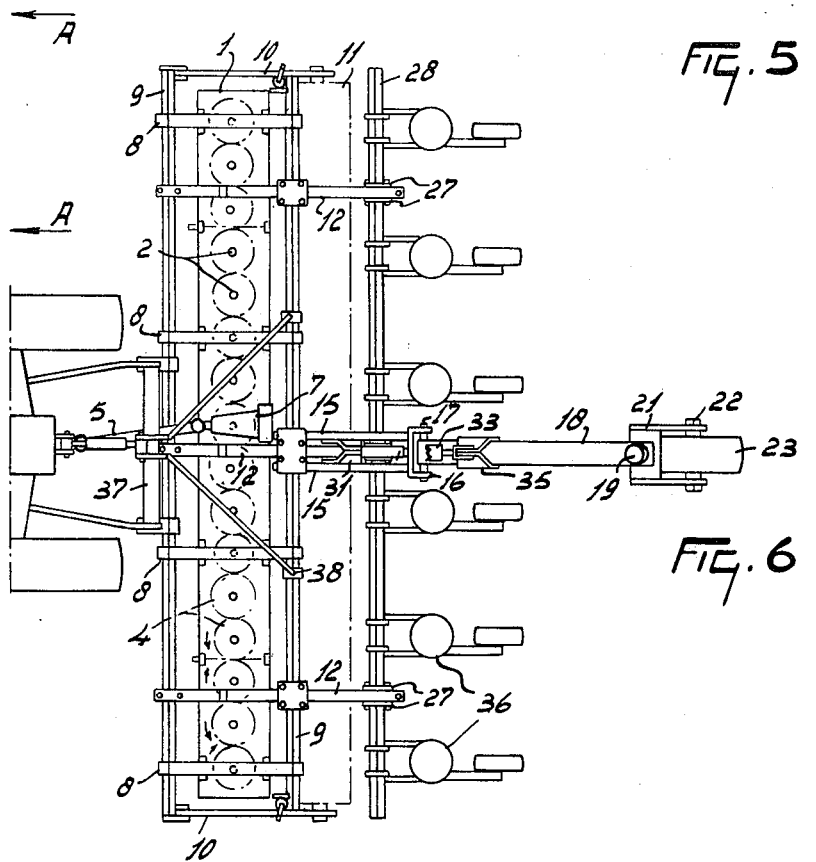
Figure 7:
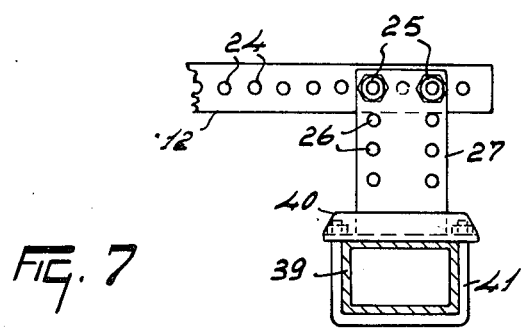

For a better understanding of the invention and to show how the same may be carried into effect, reference will now be made by way of example to the accompanying drawings, in which:

FIG. 1 is a schematic plan view of a first form of soil cultivating machine shown coupled to a tractor, FIG. 2 is a side view of the machine of FIG. 1, taken in the direction of arrow II in FIG. 1, and illustrating the machine in operative condition, FIG. 3 is a cross sectional view of the machine of FIG. 1, taken on line III—III in FIG. 1, FIG. 4 is a plan view of a part of the machine of FIG. 1 taken in the direction of arrow IV in FIG. 3, FIG. 5 is a side view of the machine, taken from the same view point as FIG. 1 but illustrating the machine in a transport condition, FIG. 6 is a schematic plan view of a second form of soil cultivating machine, shown coupled to a tractor, and FIG. 7 is a cross sectional view illustrating, in an alternative form, a detail of either of the machines of FIGS. 1 to 5, or 6.

The soil cultivating machine of FIGS. 1 to 5 has a frame that includes a hollow frame portion 1 extending transversely of the intended direction of operative travel A of the machine and accommodating at intervals of preferably about 25 cms upright, (in the machine illustrated substantially vertical) rotary shafts 2 of a plurality of soil cultivator members in the form of rotors 3. Each rotor 3 comprises a support provided with two tines, the support extending substantially horizontally and being secured to the end of the rotary shaft 2 projecting from the bottom of the hollow frame portion 1. The tines are disposed near the ends of the support. In the machine illustrated sixteen rotors 3 are arranged in a row extending approximately at right angles to the direction of travel A. The overall working width of the machine is about 4 meters.

The shafts 2, which are journalled in the hollow frame portion 1, are each provided inside this frame portion with a gear wheel 4, the diameter of which is such that the gear wheels 4 on two adjacent shafts 2 are in mesh with one another. The rotors 3 are driven by means of a lay shaft 5 coupled with the power take-off shaft of the tractor that propels the machine, the lay shaft 5 being linked to an input shaft 6 of the machine. The shaft 6 is connected through a transmission mechanism including a change-speed gear 7A accommodated in a gear box 7, with the gear wheels 4 on the rotary shafts 2.

The box-shaped frame portion 1 is provided with relatively parallel supports 8, located above the frame portion 1 and arranged at equal distances from one another and extending substantially in the direction of travel A. The supports 8 project beyond the front and rear (with respect to the direction of travel A) of the frame portion 1 and hold near their ends so as to be in front of, or behind, the frame portion 1 front and rear supporting beams 9 extending transversely of the direction of travel A and hence parallel to the frame portion 1. The supporting beams 9 together with the supports 8 constitute a supporting structure, the front supporting beam 9 being located at a lower level than the rear supporting beam 9.

The ends of the front beam 9 have secured to them arms 10 extending in the direction of travel A and being adjustable in a direction of height. Between the rear ends of the arms 10 a rotatable supporting member 11 covering substantially the whole width of the machine is provided by means of which the working depth of the cultivator members (the rotors 3) can be selected.

The supporting beams 9 have secured to them near the ends of the frame portion 1 supports 12 extending in the direction of travel A beyond the rear supporting beam 9 over a length which is at least equal to the distance between the supporting beams 9. The supports 12 are each secured by means of clamps 13 and 14 to the respective beams 9 so that they can be readily disengaged and their spacing from one another can be readily varied. The rear beam 9 has furthermore secured to it by means of each clamp 14 two arms 15 located each on one side of each support 12. The rear ends of each pair of arms 15 have fast therewith a U-shaped bracket 16, the limbs of which extend to the rear in a substantially horizontal direction. At the front each bracket 16 has an eyelet 21A fitting in a recess at the rear end of the support 12, through which eyelet, and a hole in the support 12, a pin 21B is passed for securing the bracket 16 to this end of the support 12. Between the limbs of each bracket 16 an arm 18 aligned with the arms 15 is pivotally secured by means of a stub shaft 17 extending transversely of the direction of travel A, the arm 18 thus being pivotally secured to the support assembly constituted by the support 12 and the pair of arms 15, which assembly is a part of the support 12, which support extends in the direction of travel A over and across a tool bar 28 (described below). The longitudinal centre lines, which form the pivotal axes of the arm 18, of the two stub shafts 17 register with each other.

Near its free end each arm 18 is provided with a sleeve 19. If the arm 18 extends substantially in a horizontal direction, the sleeve 19 is inclined forwardly in an upward direction. Each sleeve 19 pivotally supports a stub shaft 20 carrying a bracket 21 at its lower end. Each bracket 21 has downwardly and rearwardly inclined limbs holding near their free ends a shaft 22 about which a ground wheel 23 is freely rotatable, the supporting members formed by the ground wheels 23 being located at a distance behind the hollow main portion 1 which is at least three times the width of the frame portion and being disposed one on either side of a vertical plane passing through the center of the frame portion 1. The provision of the pivoting stub shafts 20 enables the ground wheels 23 to castor.

FIG. 3 shows that the portion of each support 12 located between the arms 15 has a row of holes 24, through any selected pair of which two bolts 25 can be passed. These bolts 25 are furthermore passed through a selected pair of holes of two rows of holes 26 in each of a pair of downwardly extending plates 27. In its lower edge each plate 27 has an angular recess receiving the tool bar 28, extending transversely of the direction of travel A and being fixed in place by means of a clamping piece 29 and bolts 30. The tool bar 28 has a square section and is disposed so that a diagonal of this section is substantially vertical. Near its center the tool bar 28 is also secured in the manner described above by means of plates 27 to a support 12 extending in the direction of travel A and secured by means of clamping members to the beams 9 so as to be readily detachable.

At the top each pair of arms 15 is provided with substantially triangular, upwardly extending plates 31 that are inclined towards one another so that their top edges engage one another. At the tops of the plates 31 bores therein receive a pivot pin 32, by means of which one end of a hydraulic piston and cylinder arrangement 33 is pivotally held in place. The other end of the arrangement 33 is pivotally connected by means of a pin 34, to the engaged top edges of plates 35, similar to the plates 31, which are secured to the adjacent arm 18. It will be apparent from FIG. 3 that each hydraulic piston and cylinder arrangement 33, which communicates through conduits 33A with the hydraulic circuit of the tractor propelling the machine, is located substantially above the pivotal axis of the arm 18 to which it is connected.

Various tools can be hitched to the tool bar 28. As illustrated the tool bar 28 has attached to it side by side seed-drill units 36 (shown schematically) and it will be noted that each ground wheel is disposed between two drill units 36. Other possibilities are to attach to the tool bar 28 planting units or cultivator members for cultures in rows.

Near the center the front supporting beam 9 of the supporting structure is provided with a trestle 37, which is connected with the rear beam 9 by means of supports 40 extending away from the trestle in converging fashion. In operation the soil cultivating machine is attached by means of the trestle 37 to the three-point lifting device of the tractor and via the transmission mechanism described above, which is connected via the lay shaft 5 with the power take-off shaft of the tractor, the cultivator members (the rotors 3) can be driven in the direction indicated by arcuate arrows in FIG. 1. The working depth of the tines of the cultivator members is adjusted with the aid of the supporting member 11. The supporting members formed by the ground wheels 23 are in contact with the ground and may constitute the main support for tools attached to the tool bar 28. The position of the supporting members 23 can be adjusted from the tractor by effecting with the aid of the hydraulic piston and cylinder arrangement 33 an, for example, upward turn of the arms 18 about the pivotal axis formed by the aligned longitudinal center lines of the stub shafts 17. If the machine has to be taken out of its operative condition, the hydraulic piston and cylinder arrangement 33 can be actuated so that they rotate the arms 18 downwards while, with the aid of the lifting device of the tractor, the cultivator members and the tool bar are lifted out of the operational position. In this manner the machine is placed in its transport condition illustrated in FIG. 5. During transport the supporting members formed by the castor ground wheels 23 carried behind the tool bar on the frame portion 1 via the supporting structure including the beams 9 provide a very effective support preventing excessive loading of the lifting device of the tractor. With the aid of the supporting members formed by the ground wheels 23 the machine can be rapidly put into and taken out of operation on fields requiring many turns. If it is not desired to use the cultivator members in conjunction with one or more tools, the supporting members formed by the ground wheels 23 can be readily removed by disengaging the supports 12 from the beams 9. Remounting of the wheels 23 can likewise be readily carried out.

Turning to FIG. 6, components of this machine that correspond with those of the machine of FIGS. 1 to 5 are designated by the same reference numerals. The machine of FIG. 6 has only one supporting member formed by a castor ground wheel 23 located near the center of the machine behind the tool bar, which wheel is connected, in the manner utilised in the machine already described, with the central support 12 on the beams 9.

Instead of using the tool bar 28 shown for the machine so far described, differently shaped tool bars may be employed, for example, the tool bar 39 shown in FIG. 7. This bar 39 has a rectangular cross section, the longer sides of this section extending substantially horizontally. The tool bar 39 is secured in place by means of transverse pieces 40 fastened to the lower ends of the plates 27 and to which clamps 41 are secured.

In all cases, by means of the plates 27 the distance between the frame portion 1 and the tool bar 28 or 39, as well as the height thereof above the ground, can be varied.

Although each of the machines described has a working width of 4 ms it will be appreciated that the machines could have a smaller working width of, for example, 3 ms, or a larger working width of, for example, 6 ms. The heavy tool bar provided permits of attaching heavy tools.

While various features of the soil cultivating machines that have been described, and that are illustrated in the drawings, will be set forth in the following claims as inventive features, it is to be noted that the invention is not necessarily limited to these features and that it encompasses all of the features that have been described both individually and in various combinations.

What we claims is:

1. A soil cultivating machine comprising a frame and an elongated portion of said frame extending transverse to the direction of travel of the machine, a plurality of soil working members being rotatable about upwardly extending axes defined by upwardly extending shafts positioned in a transverse row and journalled in said frame portion, drive means connected to rotate said shafts, a supporting structure being located above said frame portion and comprising at least two transverse spaced apart beams, a front beam located adjacent the front of said frame portion and a rear beam positioned adjacent the rear of said frame portion, an elongated tool bar extending across substantially the entire working width of said row and said bar being positioned at the rear of said soil working members, rearwardly extending supporting means interconnecting said bar with said supporting structure, a part of said supporting means extending to the rear of said tool bar and at least one ground engaging support wheel being connected to said part, means for adjusting the vertical position of said bar with respect to said wheel, said bar together with said supporting means being detachably fastened to the supporting structure of said machine.

2. A soil cultivating machine as claimed in claim 1, wherein said supporting means comprises an elongated support that extends over and across said tool bar.

3. A soil cultivating machine as claimed in claim 1, wherein said supporting means includes two supporting assemblies with respective ground support wheels disposed one on either side of a vertical plane passing through the center of said frame portion, one supporting assembly being positioned adjacent one end of said portion and the other assembly being positioned adjacent the opposite end thereof.

4. A soil cultivating machine as claimed in claim 1, wherein a supporting assembly of said supporting means is laterally adjustable along the length of said structure in a direction transverse to the direction of travel and the wheel of said supporting means is pivotable about a substantially vertical axis.

5. A soil cultivating machine as claimed in claim 1, wherein said supporting means is an assembly that includes a rear arm pivotably connected to the remainder of said supporting means and turnable about a substantially horizontal axis that extends transverse to said direction of travel, a bracket pivotably attached to said rear arm and said wheel being mounted on said bracket.

6. A soil cultivating machine as claimed in claim 1, wherein said tool bar depends from said supporting means and is vertically adjustable with respect to said supporting means, means setting said tool bar in any of a plurality of positions that change the distance between said frame portion and the tool bar.

7. A soil cultivating machine as claimed in claim 1, wherein the wheel of said supporting means is pivotable about an upwardly and forwardly extending axis.

8. A soil cultivating machine as claimed in claim 1, wherein said supporting means includes elongated arms pivoted to a rear arm and said wheel is mounted at the rear of said rear arm, a hydraulic piston and cylinder assembly interconnecting said arms with said rear arm and bridging the pivot connection, said hydraulic piston and cylinder assembly being located above said tool bar and being positioned to pivot said arms with respect to the rear arm to raise and lower said bar.

9. A soil cultivating machine as claimed in claim 1, wherein a coupling is mounted on the front of said structure for connection to a prime mover lifting device, said supporting means including an assembly secured to said structure and said assembly including a rear arm that is pivoted to the remainder of said assembly, hydraulic means interconnecting said arm with said remainder, said hydraulic means bridging a portion of the assembly that carries said tool bar and pivot connection to the rear arm, said tool bar being vertically displaceable by the hydraulic means and the frame portion being movable to a raised transport position by the lifting device, whereby that device and said wheel sustain the entire weight of the machine.

10. A soil cultivating machine comprising a frame, an elongated portion of said frame extending transverse to the direction of travel of the machine, a plurality of soil working members being rotatable about upwardly extending axes defined by upwardly extending shafts positioned in a transverse row and journalled in said frame portion, drive means connected to rotate said shafts, a supporting structure being located above said frame portion and comprising at least two transverse spaced apart beams, a front beam located adjacent the front of said frame portion and a rear beam positioned adjacent the rear of said frame portion, an elongated tool bar extending across substantially the entire working width of said row and said bar being positioned at the rear of said soil working members, rearwardly extending supporting assemblies interconnecting said bar with said supporting structure, one assembly being positioned adjacent one lateral end of said structure and a second assembly positioned adjacent the opposite lateral end of the structure, a part of each assembly extending to the rear of said tool bar and at least one ground engaging support wheel being connected to that part, means adjusting the vertical position of said bar with respect to said wheel, said bar together with said assemblies being detachably fastened to the supporting structure.

* * * * *